US011711778B2

(12) United States Patent
Liu et al.

(10) Patent No.: US 11,711,778 B2
(45) Date of Patent: Jul. 25, 2023

(54) METHOD AND APPARATUS FOR UPLINK TIMING SYNCHRONIZATION

(71) Applicant: Huawei Technologies Co., Ltd., Shenzhen (CN)

(72) Inventors: Peng Liu, Shenzhen (CN); Jun Chen, Dongguan (CN); Jingjing Huang, Shenzhen (CN); Guangjian Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 17/487,679

(22) Filed: Sep. 28, 2021

(65) Prior Publication Data

US 2022/0022152 A1 Jan. 20, 2022

Related U.S. Application Data

(63) Continuation of application No. PCT/CN2020/081590, filed on Mar. 27, 2020.

(30) Foreign Application Priority Data

Mar. 29, 2019 (CN) .......................... 201910252495.X

(51) Int. Cl.
*H04W 56/00* (2009.01)
*H04W 36/00* (2009.01)
*H04W 84/06* (2009.01)

(52) U.S. Cl.
CPC ... *H04W 56/009* (2013.01); *H04W 36/00837* (2018.08); *H04W 56/001* (2013.01); *H04W 84/06* (2013.01)

(58) Field of Classification Search
CPC ......... H04W 56/009; H04W 36/00837; H04W 56/001; H04W 84/06; H04W 56/0015;
(Continued)

(56) References Cited

U.S. PATENT DOCUMENTS 5,790,939 A * 8/1998 Malcolm ............ H04B 7/18513
370/324
10,547,374 B1 * 1/2020 Liu ....................... H04W 52/42
(Continued)

FOREIGN PATENT DOCUMENTS

CN 1135010 C 1/2004
CN 1753550 A 3/2006
(Continued)

OTHER PUBLICATIONS

Del Re, E. et al., "The GSM Procedures in an Integrated Cellular/Satellite System", IEEE Journal on Selected Areas in Communications, vol. 13, No. 2, Feb. 1, 1995 pp. 421-430.
(Continued)

*Primary Examiner* — Afshawn M Towfighi
(74) *Attorney, Agent, or Firm* — Slater Matsil, LLP

(57) ABSTRACT

This application provides methods and apparatuses for uplink timing synchronization. The method includes: determining, based on beam information of a first beam and ephemeris information of the satellite base station, an uplink timing frame number of a first cell corresponding to the first beam; determining timing information of a first terminal device in the first cell based on the uplink timing frame number of the first cell, where the timing information is used to indicate a timing advance or a timing lag; and outputting the timing information.

19 Claims, 14 Drawing Sheets

(58) Field of Classification Search
CPC ............. H04W 56/0005; H04B 7/1851; H04B 7/18519; H04B 7/18541; H04B 7/18513
See application file for complete search history.

(56) References Cited

U.S. PATENT DOCUMENTS

| | | | |
|---|---|---|---|
| 2014/0125519 | A1 | 5/2014 | Brown et al. |
| 2016/0095074 | A1* | 3/2016 | Park ................... H04W 56/001 370/350 |
| 2018/0054837 | A1 | 2/2018 | Islam et al. |
| 2022/0132593 | A1* | 4/2022 | Ren ................... H04W 74/0866 |
| 2023/0111629 | A1* | 4/2023 | Van Wageningen ........................ H04B 10/1129 398/118 |

FOREIGN PATENT DOCUMENTS

| | | |
|---|---|---|
| CN | 101854713 A | 10/2010 |
| CN | 103379435 A | 10/2013 |
| CN | 103945471 A | 7/2014 |
| CN | 103969662 A | 8/2014 |
| CN | 104777490 A | 7/2015 |
| CN | 105493584 A | 4/2016 |
| CN | 105960820 A | 9/2016 |
| CN | 107197517 A | 9/2017 |
| CN | 107333241 A | 11/2017 |
| CN | 107682870 A | 2/2018 |
| CN | 108282198 A | 7/2018 |
| CN | 109031377 A | 12/2018 |
| EP | 3425969 A1 | 1/2019 |
| KR | 100589934 B1 | 6/2006 |
| WO | 2016004627 A1 | 1/2016 |
| WO | 2016165433 A1 | 10/2016 |
| WO | 2016178838 A1 | 11/2016 |

OTHER PUBLICATIONS

Lin, X. et al., "5G New Radio Evolution Meets Satellite Communications: Opportunities, Challenges, and Solutions", arxiv.org, Cornell University Library, Ithaca, NY, Mar. 27, 2019.

Zhu, H. et al., "A Time Synchronization Method of Power Grid Based on TD-LTE Frame Synchronization", 2017 IEEE Power & Energy Society General Meeting, Jul. 16-20, 2017, 5pages.

Zhang, G. et al.,"Power Grid Time Synchronization Method Based on TD-LTE Frame Synchronization", Journal of Beijing University of Posts and Telecommunications, vol. 40, No. 1, Feb. 2017, 7 pages.

Thales et al., "NR-NTN: solution principles for NR to support non-terrestrial networks", 3GPP TSG RAN1 Meeting #93, R1-1807864, Busan, Korea, May 21-25, 2018,12 pages.

Okia, et al., "Considerations on Timing Advance and Random Access for NTN", 3GPP TSG RAN WG1 Meeting #93, R1-1806768, Busan, Korea, May 21-25, 2018, 4 pages.

3rd Generation Partnership Project Technical Specification Group Radio Access Network; NR; Physical channels and modulation (Release 15), 3GPP TS 38.211 V15.5.0 (Mar. 2019), 96 pages.

Nec, "Synchronization mechanism for NR sidelink" 3GPP TSG RAN WG1 #96bis, R1-1904655 Xi'an, China, Apr. 8-12, 2019, 5 pages.

* cited by examiner

200

```
┌─────────────────────────────────────────────────────────┐
│ Determine, based on beam information of a first beam    │
│ and orbit information of a satellite base station, an   │─── 210
│ uplink timing frame number of a first cell              │
│ corresponding to the first beam                         │
└─────────────────────────────────────────────────────────┘
                            │
┌─────────────────────────────────────────────────────────┐
│ Determine timing information of a first terminal device │─── 220
│ in the first cell based on the uplink timing frame      │
│ number of the first cell                                │
└─────────────────────────────────────────────────────────┘
                            │
┌─────────────────────────────────────────────────────────┐
│ Send the timing information to the first terminal device│─── 230
└─────────────────────────────────────────────────────────┘
```

FIG. 5

METHOD AND APPARATUS FOR UPLINK TIMING SYNCHRONIZATION

CROSS-REFERENCE TO RELATED APPLICATIONS

This application is a continuation of International Application No. PCT/CN2020/081590, filed on Mar. 27, 2020, which claims priority to Chinese Patent Application No. 201910252495.X, filed on Mar. 29, 2019. The disclosures of the aforementioned applications are hereby incorporated by reference in their entireties.

TECHNICAL FIELD

This application relates to the field of satellite communications technologies, and more specifically, to a method and apparatus for uplink timing synchronization.

BACKGROUND

In uplink transmission in a wireless communications system, to avoid interference between terminal devices, time at which uplink signals from terminal devices in a same cell arrive at a base station needs to be basically aligned, that is, uplink timing synchronization is required. To ensure uplink timing synchronization on a receive side (a base station side), a timing advance (TA) mechanism is introduced.

From a perspective of a UE side, a TA is essentially an offset between start time of receiving a downlink subframe from the base station side and time of sending an uplink subframe from the base station side. The base station side may control, by configuring different offsets for different terminal devices, time at which uplink signals of the different terminal devices arrive at the base station to be basically aligned. For example, compared with a terminal device that is closer to the base station, a terminal device that is farther away from the base station has a larger transmission delay. Therefore, an uplink signal needs to be sent earlier.

The base station side configures, for each terminal device in the cell, a TA that belongs to the terminal device, and delivers the TA to the terminal device. In this way, each terminal device sends an uplink signal based on the TA of the terminal device. In a satellite communications system, transmission delays of terminal devices in a cell are different from each other and greatly differ from each other. Uplink timing frame numbers that are on the base station side and that are determined by terminal devices whose transmission delay differences are greater than a subframe length based on TAs of the terminal devices are different. However, many operations at a physical layer are related to the uplink timing frame number. If uplink timing frame numbers from terminal devices in a cell to a satellite base station side are different, great storage overheads are caused for managing the uplink timing frame numbers by the satellite base station.

SUMMARY

This application provides a method for uplink timing synchronization, applied to a satellite communications system. This can reduce storage overheads of a satellite base station.

According to a first aspect, this application provides a method for uplink timing synchronization. The method includes: determining, based on beam information of a first beam and ephemeris information of the satellite base station, an uplink timing frame number of a first cell corresponding to the first beam; determining timing information of a first terminal device in the first cell based on the uplink timing frame number of the first cell, where the timing information is used to indicate a timing advance or a timing lag; and outputting the timing information of the first terminal device.

It should be noted that in this application, the timing advance not only includes a meaning of a timing advance, but also includes a timing value. Similarly, the timing lag not only includes a meaning of a timing lag, but also includes a timing value. Alternatively, a timing value may also be referred to as a timing amount. An advance or a lag indicates that UE should send an uplink signal in advance or send an uplink signal with a lag.

In technical solutions of this application, the satellite base station determines, based on beam information of a generated beam and the ephemeris information of the satellite base station, an uplink timing frame number of a cell corresponding to the beam. The satellite base station configures, for each UE in the cell, timing information that enables uplink timing of the UE to be aligned with the uplink timing frame number of the cell, and delivers the timing information to each UE. Each UE performs uplink sending based on its own timing information. For the satellite base station, an uplink timing frame number does not need to be stored for each UE in the cell, and only the uplink timing frame number of the cell needs to be stored, thereby reducing storage overheads.

Different from TA information in LTE or NR, timing information in this embodiment of this application is used to indicate a timing advance or a timing lag. In other words, in this application, a timing may be a positive number, or may be a negative number. When being a positive number, the timing is referred to as a timing advance, or when being a negative number, the timing is referred to as a timing lag. In other words, in the technical solutions of this application, an existing TA is extended to a negative number. In a cell, uplink timing of some terminal devices may be a timing advance, and uplink timing of some terminal devices may be a timing lag, so that uplink timing frame numbers of different terminal devices that are in the cell and that are on a satellite base station side are unified.

Optionally, after the outputting the timing information of the first terminal device, the method further includes: sending the timing information to the first terminal device.

With reference to the first aspect, in some implementations of the first aspect, the determining, based on beam information of a first beam and ephemeris information of the satellite base station, an uplink timing frame number of a first cell corresponding to the first beam includes: determining, based on the beam information of the first beam and the ephemeris information of the satellite base station, a second terminal device and a third terminal device in the first cell, where the second terminal device is a terminal device that is in the first cell and that is closest to the satellite base station, and the third terminal device is a terminal device that is in the first cell and that is farthest away from the satellite base station; determining a candidate frame number set based on a first round-trip delay for signal transmission between the second terminal device and the satellite base station and a second round-trip delay for signal transmission between the third terminal device and the satellite base station; and selecting a first frame number from the candidate frame number set as the uplink timing frame number of the first cell.

With reference to the first aspect, in some implementations of the first aspect, the determining, based on a first round-trip delay and a second round-trip delay, a candidate frame number set includes: determining, based on the first round-trip delay, the second round-trip delay, and a plurality of first constraint conditions, the candidate frame number set of the first cell, where the plurality of first constraint conditions include: candidate frame numbers are integer multiples of a time unit for communication between the satellite base station and terminal devices; a minimum value of the candidate frame numbers is an integer that is not greater than and closest to the first round-trip delay; and a maximum value of the candidate frame numbers is an integer that is not less than and closest to the second round-trip delay.

With reference to the first aspect, in some implementations of the first aspect, the selecting, from the candidate frame number set, x with smallest $|x-RTD_1|+|x-RTD_2|$ or $$\left| x - \frac{RTD_1 + RTD_2}{2} \right|$$

as the uplink timing frame number of the first cell, where x is the first frame number, $RTD_1$ is the first round-trip delay, and $RTD_2$ is the second round-trip delay.

With reference to the first aspect, in some implementations of the first aspect, after the first terminal device accesses the first cell, the method further includes: determining that the first terminal device triggers cell handover; determining whether an uplink timing frame number of a target cell is consistent with the uplink timing frame number of the first cell; and when determining that the uplink timing frame number of the target cell is inconsistent with the uplink timing frame number of the first cell, outputting timing information of the target cell.

Further, after the outputting timing information of the target cell, the method further includes: sending the timing information of the target cell to the first terminal device.

In this embodiment, when the satellite base station determines that uplink timing of the target cell is inconsistent with uplink timing of a source cell, the satellite base station notifies the terminal device of the uplink timing frame number of the target cell.

With reference to the first aspect, in some implementations of the first aspect, the method further includes: when determining that the uplink timing frame number of the target cell is consistent with the uplink timing frame number of the first cell, handing over the first terminal device from the first cell to the target cell.

With reference to the first aspect, in some implementations of the first aspect, the timing information includes the timing value and whether the timing value is positive or negative. When the timing value is positive, the timing information is specifically used to indicate the timing advance, and when the timing value is negative, the timing information is specifically used to indicate the timing lag.

Optionally, the sending the timing information to the first terminal device includes: sending the timing information to the first terminal device by using a random access response message. Whether the timing value is positive or negative may be indicated by a reserved bit of a TA control (timing advance command) field in the random access response message.

According to a second aspect, this application provides a method for uplink timing synchronization. The method includes: receiving timing information used to perform uplink timing synchronization with a first cell; determining a timing advance or a timing lag based on the timing information; and performing uplink timing synchronization based on the timing advance or the timing lag.

With reference to the second aspect, in some implementations of the second aspect, before the determining a timing advance or a timing lag based on the timing information, the method further includes: determining that the timing information is from a satellite base station.

With reference to the second aspect, in some implementations of the second aspect, the timing information includes a timing value and whether the timing value is positive or negative, and the determining a timing advance or a timing lag based on the timing information includes: when determining that the timing value is positive, determining the timing advance based on the timing value; or when determining that the timing value is negative, determining the timing lag based on the timing value.

With reference to the second aspect, in some implementations of the second aspect, after the first terminal device accesses the first cell, the method further includes: triggering cell handover; receiving timing information of a target cell from the satellite base station; and updating the timing information of the first cell to the timing information of the target cell.

With reference to the second aspect, in some implementations of the second aspect, the method further includes: performing uplink timing synchronization with the target cell based on the timing information of the target cell.

According to a third aspect, this application provides a cell handover method. The method includes: determining that a first terminal device triggers cell handover; determining whether an uplink timing frame number of a target cell is consistent with an uplink timing frame number of a source cell; and when determining that the uplink timing frame number of the target cell is inconsistent with the uplink timing frame number of the source cell, sending timing information of the target cell to the first terminal device, where the timing information is used to indicate a timing advance or a timing lag.

With reference to the third aspect, in some implementations of the third aspect, the method further includes: when determining that the uplink timing frame number of the target cell is consistent with the uplink timing frame number of the source cell, handing over the first terminal device from the source cell to the target cell.

According to a fourth aspect, this application provides a cell handover method, where the method includes: triggering cell handover; receiving timing information of a target cell from a satellite base station, where the timing information is used to indicate a timing advance or a timing lag, and the timing information is sent by the satellite base station when determining that an uplink timing frame number of the target cell is inconsistent with an uplink timing frame number of a source cell; and determining the timing advance or the timing lag based on the timing information, and performing uplink timing synchronization with the target cell based on the timing advance or the timing lag.

Optionally, the timing information includes a timing value and whether the timing value is positive or negative, and the determining the timing advance or the timing lag based on the timing information includes: when determining that the timing value positive, determining the timing advance based on the timing value; or when determining that the timing value is negative, determining the timing lag based on the timing value.

According to a fifth aspect, this application provides a communications apparatus. The communications apparatus has a function of implementing the method in any one of the first aspect or the possible implementations of the first aspect or any one of the third aspect or the possible implementations of the third aspect. The function may be implemented by using hardware, or may be implemented by executing corresponding software by using hardware. The hardware or the software includes one or more units corresponding to the foregoing functions.

According to a sixth aspect, this application provides a communications apparatus. The communications apparatus has a function of implementing the method in any one of the second aspect or the possible implementations of the second aspect or any one of the fourth aspect or the possible implementations of the fourth aspect. The function may be implemented by using hardware, or may be implemented by executing corresponding software by using hardware. The hardware or the software includes one or more units corresponding to the foregoing functions.

According to a seventh aspect, this application provides a network device, including a processor and a memory. The memory is configured to store a computer program, and the processor is configured to invoke and run the computer program stored in the memory, so that the network device performs the method in any one of the first aspect or the possible implementations of the first aspect or any one of the third aspect or the possible implementations of the third aspect.

According to an eighth aspect, this application provides a terminal device, including a processor and a memory. The memory is configured to store a computer program, and the processor is configured to invoke and run the computer program stored in the memory, so that the terminal device performs the method in any one of the second aspect or the possible implementations of the second aspect or any one of the fourth aspect or the possible implementations of the fourth aspect.

According to a ninth aspect, this application provides a computer-readable storage medium. The computer-readable storage medium stores computer instructions, and when the computer instructions are run on a computer, the computer is enabled to perform the method according to any one of the first aspect or the possible implementations of the first aspect, or perform the method according to any one of the third aspect or the possible implementations of the third aspect.

According to a tenth aspect, this application provides a computer-readable storage medium. The computer-readable storage medium stores computer instructions, and when the computer instructions are run on a computer, the computer is enabled to perform the method according to any one of the second aspect or the possible implementations of the second aspect, or perform the method according to any one of the fourth aspect or the possible implementations of the fourth aspect.

According to an eleventh aspect, this application provides a chip, including a processor. The processor is configured to read and execute a computer program stored in a memory, to perform the method according to any one of the first aspect or the possible implementations of the first aspect, or perform the method according to any one of the third aspect or the possible implementations of the third aspect.

Optionally, the chip further includes the memory, and the memory and the processor are connected to the memory through a circuit or a wire.

Further, optionally, the chip includes a communications interface.

According to a twelfth aspect, this application provides a chip, including a processor. The processor is configured to read and execute a computer program stored in a memory, to perform the method according to any one of the second aspect or the possible implementations of the second aspect, or perform the method according to any one of the fourth aspect or the possible implementations of the fourth aspect.

Optionally, the chip further includes the memory, and the memory and the processor are connected to the memory through a circuit or a wire.

Further, optionally, the chip includes a communications interface.

According to a thirteenth aspect, this application provides a computer program product. The computer program product includes computer program code, and when the computer program code is run on a computer, the computer is enabled to perform the method according to any one of the first aspect or the possible implementations of the first aspect, or perform the method according to any one of the third aspect or the possible implementations of the third aspect.

According to a fourteenth aspect, this application provides a computer program product. The computer program product includes computer program code, and when the computer program code is run on a computer, the computer is enabled to perform the method according to any one of the second aspect or the possible implementations of the second aspect, or perform the method according to any one of the fourth aspect or the possible implementations of the fourth aspect.

In the technical solutions of this application, the satellite base station determines, based on beam information of a generated beam and the ephemeris information of the satellite base station, an uplink timing frame number of a cell corresponding to the beam. The satellite base station configures, for each UE in the cell, timing information that enables uplink timing of the UE to be aligned with the uplink timing frame number of the cell, and delivers the timing information to each UE. Each UE performs uplink sending based on its own timing information. For the satellite base station, only one uplink timing frame number needs to be stored for one cell, thereby reducing storage overheads.

BRIEF DESCRIPTION OF THE DRAWINGS

FIG. 5 is a flowchart of a method 200 for uplink timing synchronization applicable to a satellite communications system according to this application;

DETAILED DESCRIPTION OF ILLUSTRATIVE EMBODIMENTS

The following describes technical solutions of this application with reference to accompanying drawings.

Figure 1:
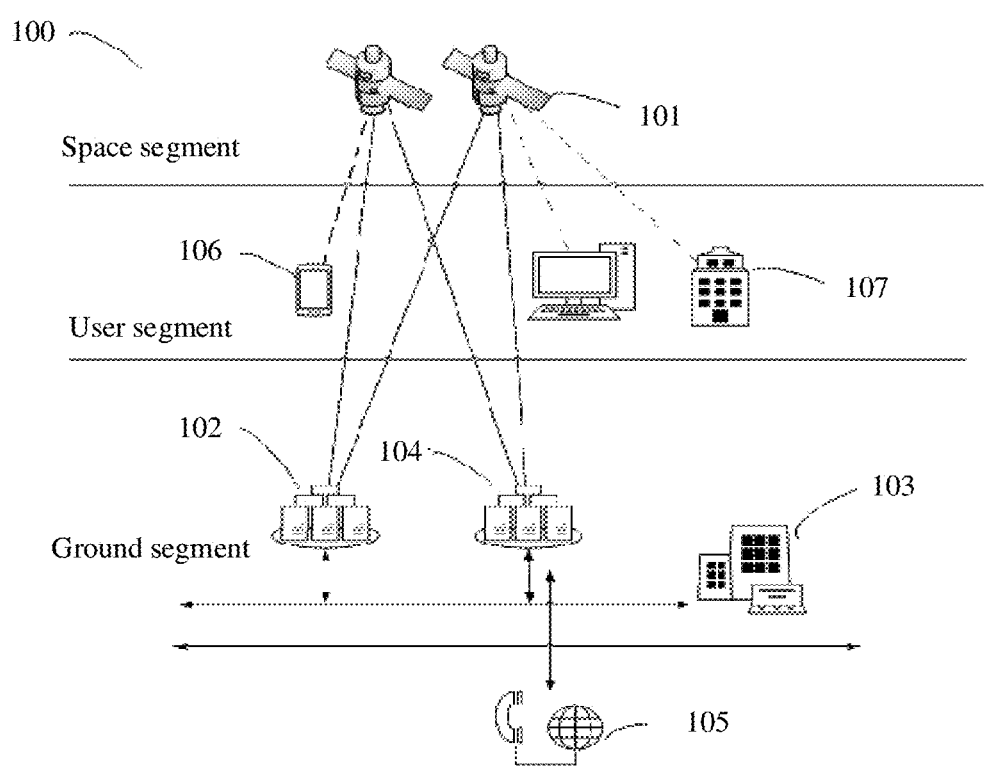
FIG. 1 is an architectural diagram of a satellite communications system.

The technical solutions of this application may be applied to a satellite communications system. FIG. 1 is an architectural diagram of a satellite communications system. A satellite communications system 100 generally includes three parts: a space segment, a ground segment, and a user segment. The space segment may include a geostationary earth orbit (GEO) satellite, a non-geostationary orbit (NGEO) satellite, or a satellite network 101 including a plurality of GEO satellites and NGEO satellites. The ground segment generally includes a satellite control center 102, a network control center (NCC) 103, various gateway stations (gateway) 104, and the like, and the gateway station is also referred to as a gateway. The network control center is also referred to as a system control center (SCC). The user segment includes various terminal devices. The terminal device may be various mobile terminals 106, for example, a mobile satellite phone, or may be various fixed terminals 107, for example, a communications ground station. In FIG. 1, a dashed line refers to a communication signal between a satellite and a terminal. A solid line refers to a communication signal between a satellite and a device in the ground segment. A bidirectional arrow line indicates a communication signal between NEs in the ground segment. In the satellite communications system, the satellite may also be referred to as a satellite base station. In FIG. 1, the satellite base station may transmit downlink data to the terminal device. The downlink data may be transmitted to the terminal device after channel coding, and modulation and mapping. The terminal device may also transmit uplink data to the satellite base station. The uplink data may also be transmitted to the satellite base station after channel coding, and modulation and mapping.

The satellite control center 102 in the ground segment has functions such as maintaining, monitoring, and controlling an orbital position and a posture of the satellite, and managing an ephemeris of the satellite. The network control center 103 has functions of processing user registration, identity confirmation, charging, and other network management. In some satellite mobile communications systems, the network control center and the satellite control center are combined. The gateway 104 has functions such as call processing and switching, and interfacing with a ground communications network. A ground communications network 105 is a part of the ground segment of the satellite network, used to switch a data packet of the satellite to a core network and send the data packet to an end terminal device. The ground communications network may be a public switched telephone network (PSTN), a public land mobile network (PLMN), or other private networks. Different land communications networks require different gateway functions of the gateway station.

In some satellite communications systems, a space segment of the satellite communications system may be a multi-layer structure including a management satellite and one or more serving satellites. In a networking of a multi-layered satellite communications system, a space segment may include one or more management satellites and serving satellites managed by the management satellites. The satellite or satellite base station mentioned in this application is not limited to a management satellite or a serving satellite.

The satellite base station and the terminal device communicate by using a communications system that includes but is not limited to the following: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or new radio (NR).

The terminal device in this embodiment of this application needs to access a mobile satellite communications network by using the ground segment of the satellite communications system, to perform mobile communication. The terminal device may be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). The terminal device represented by a satellite phone and a vehicle-mounted satellite system can directly communicate with the satellite. A fixed terminal represented by a ground communication station can communicate with the satellite only after being relayed by a ground station. The terminal device sets and obtains a communication status by installing a wireless transceiver antenna, to complete communication.

Figure 2:
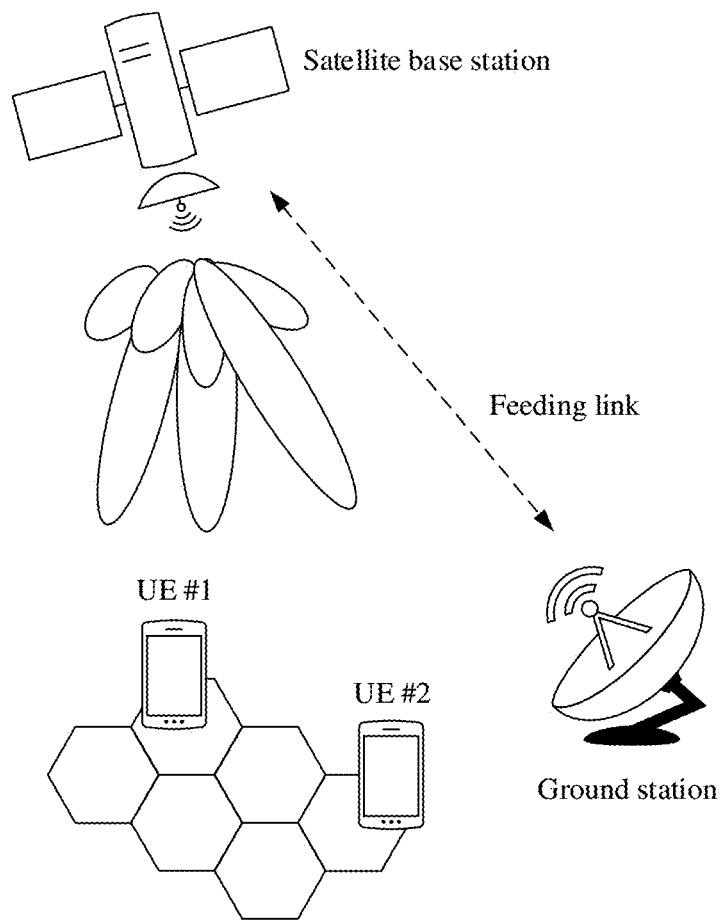
FIG. 2 is a simplified schematic diagram of a satellite communications system.

FIG. 2 is a simplified schematic diagram of a satellite communications system. As shown in FIG. 2, an inter-satellite link may exist between satellites, to provide a backhaul link (not shown in FIG. 2). The satellite usually forms a plurality of beams, and each beam corresponds to one cell (or a sector). Delays for different terminal devices located in a same cell to arrive at the satellite are different. An uplink synchronization technology needs to be used to enable uplink signals of different terminal devices to arrive at a satellite base station at basically a same time, to ensure that terminal devices do not interfere with each other.

For example, in FIG. 2, UE #1 and UE #2 are located in a same cell. However, delays of communication between the UE #1 and the satellite and communication between the UE #2 and the satellite are different, and an uplink synchronization mechanism is required to ensure that the UE #1 and the UE #2 do not interfere with each other. In a time division duplexing (time division duplexing, TDD) system, a communication signal is divided into several slots (slot) of a specific length in terms of time. A slot can only be one of an uplink slot or a downlink slot, and the satellite cannot simultaneously receive and send signals at a moment. In the TDD system, uplink synchronization not only avoids interference between users, but also ensures alignment between uplink and downlink frames, to avoid uplink and downlink interference.

To ensure uplink synchronization on a receive end, LTE proposes a timing advance (TA) mechanism. From a perspective of a UE side, an essence of a timing advance is a negative offset between start time at which a downlink subframe is received and time at which an uplink subframe is transmitted. A base station may control, by properly controlling an offset of each UE, time at which uplink signals from different UEs arrive at the base station. In brief, because of a longer transmission delay, UE that is farther away from the base station needs to send an uplink signal in advance compared with UE that is closer to the base station.

It should be understood that timing of an uplink subframe and timing of a downlink subframe on a base station side are the same, and there is an offset between timing of an uplink subframe and timing of a downlink subframe on the UE side. Different UEs have different TAs. Therefore, TAs are configured at a UE level.

Figure 3:
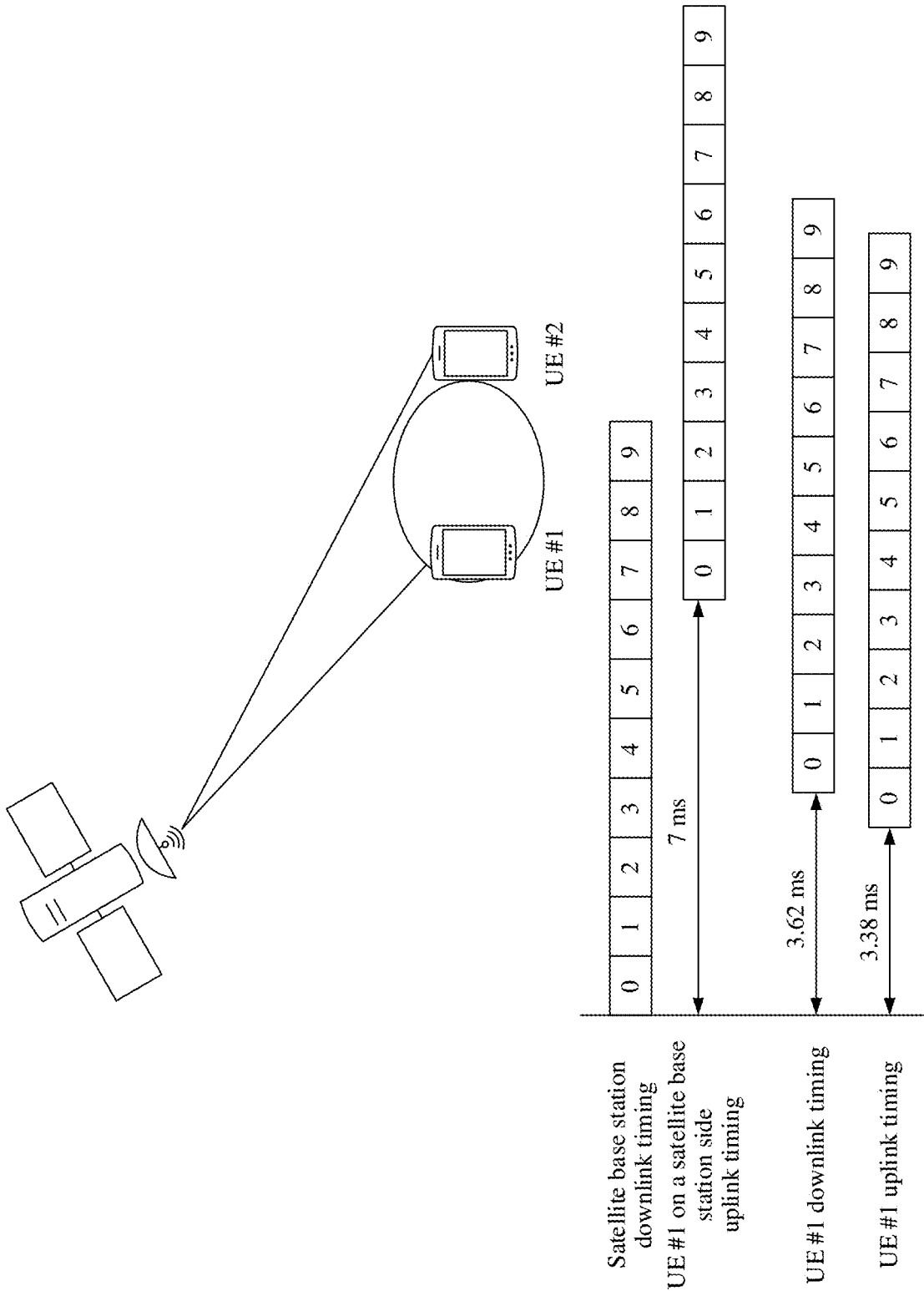
FIG. 3 is a schematic diagram of configuring a TA to ensure uplink timing synchronization in a satellite communications system.

The following describes an uplink timing synchronization process in a satellite communications system with reference to FIG. 3.

FIG. 3 is a schematic diagram of configuring a TA to ensure uplink timing synchronization in a satellite system. As shown in FIG. 3, it is assumed that a communication signal is divided into slots with an interval of 1 ms, and a delay for UE #1 to arrive at a satellite is 3.62 ms. To ensure that an uplink signal sent by the UE #1 arrives at a satellite base station after an integer multiple of a slot length (which is specifically 7 ms in this example), the satellite base station configures TA=240 μs for the UE #1. In this way, a period of time obtained by subtracting a timing advance from a round-trip delay (RTD) of signal transmission between the satellite base station and the UE is equal to an integer multiple of a slot. Therefore, it can be ensured that the uplink signal sent by the UE #1 arrives at the satellite base station after an integer multiple of a slot. Sending of an uplink signal of UE #2 is similar.

A TA is a key technology used in LTE and NR to eliminate a time difference between UEs in a cell. A base station measures a transmission delay between the base station and UE based on a physical random access channel (PRACH) sent by the UE in a random access process, and configures a TA for the UE. Then, the base station notifies the UE of the configured TA by using a random access response. The UE adjusts sending time of an uplink signal based on the TA, to complete uplink timing synchronization.

In the satellite communications system, because a transmission delay between UE and a satellite base station is relatively large, and is usually greater than a slot length (or a subframe length) of 1 ms, different UEs in a cell have different uplink timing frame numbers on a satellite base station side. However, many operations of a physical layer are related to a frame number, for example, scrambling and a pilot signal. If uplink timing frame numbers from different UEs in a cell to a base station are inconsistent, the satellite base station needs to store an uplink timing frame number of each UE in the cell.

Figure 4:
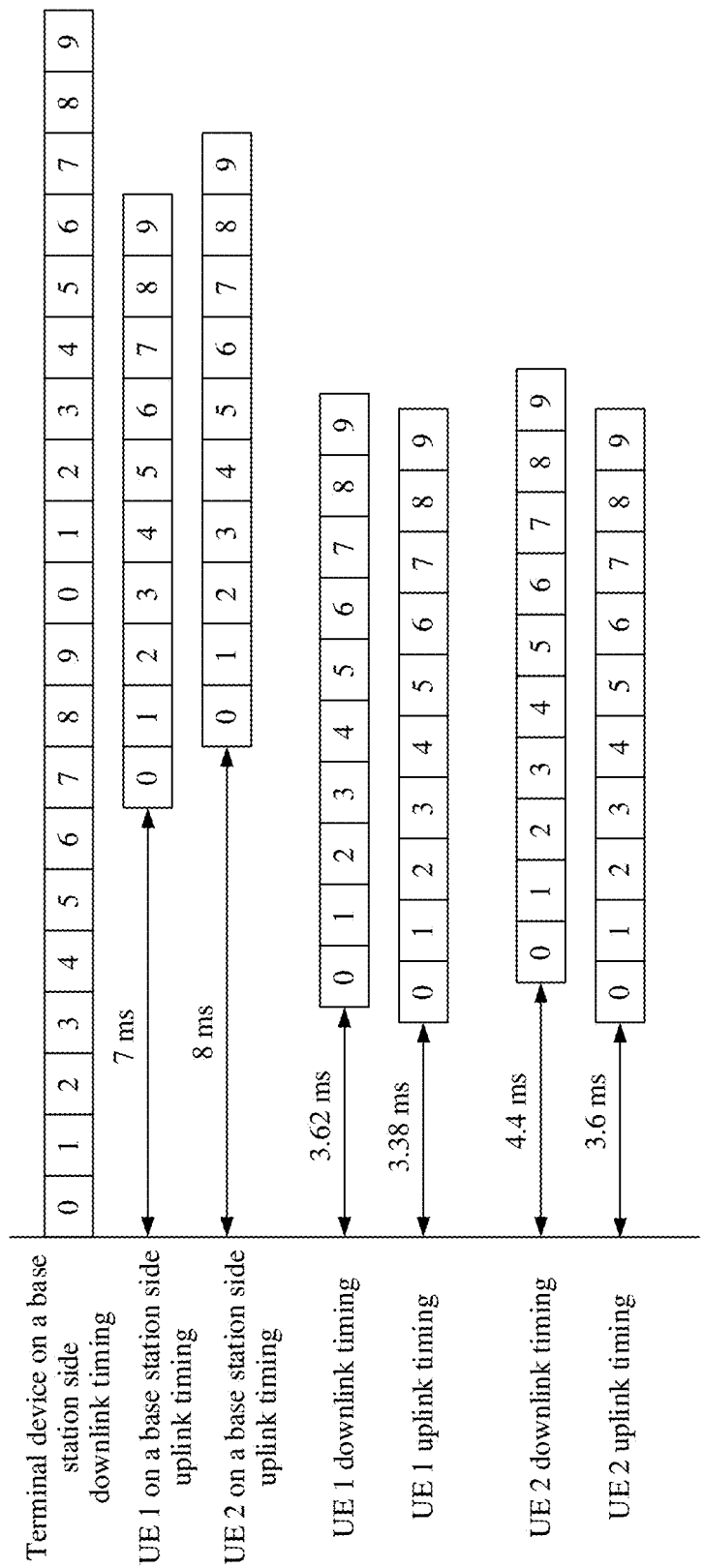
FIG. 4 is a schematic diagram of determining uplink timing frame numbers of two different UEs by a satellite communications system.

The following uses FIG. 4 as an example to describe a problem that uplink timing frame numbers of different UEs in a satellite system are inconsistent. FIG. 4 is a schematic diagram of determining uplink timing frame numbers of two different UEs by a satellite communications system.

It is assumed that a transmission delay of UE #1 is 3.62 ms, and a transmission delay of UE #2 is 4.4 ms. According to the TA configuration method described above, to ensure that uplink signals of the UE #1 and the UE #2 arrive at a base station after an integer multiple of a slot, the base station configures a TA for the UE #1 as 240 μs, and the base station configures a TA for the UE #2 as 80 μs. Therefore, an uplink timing frame number for the uplink signal of the UE #1 to arrive at the base station is 7, and an uplink timing frame number for the uplink signal of the UE #2 to arrive at the base station is 8. The base station needs to store the uplink timing frame number 7 of the UE #1 and the uplink timing frame number 8 of the UE #2. However, a very large quantity of UEs usually camp on a cell. Therefore, a satellite base station stores an uplink timing frame number for each UE, and storage overheads of the satellite base station are very large.

Therefore, this application provides a method for uplink timing synchronization, applied to a satellite communications system. This can reduce storage overheads of a satellite base station.

The following describes in detail the method for uplink timing synchronization provided in this application.

In this application, timing information is introduced to the satellite communications system, and the timing information is used to indicate a timing advance or a timing lag, so that uplink timing frame numbers of different UEs in a same cell are unified in the satellite base station. Therefore, the satellite base station only needs to store one uplink timing frame number for one cell. Compared with storing one uplink timing frame number for one UE, storage overheads of the satellite base station can be reduced.

Optionally, the timing information includes a timing value and whether the timing value is positive or negative. When the timing value is positive, the timing information is specifically used to indicate the timing advance. When the timing value is negative, the timing information is specifically used to indicate the timing lag.

It should be noted that, as described above, an existing timing advance TA can only be a positive number, and the TA indicates an offset of start time of uplink timing relative to downlink timing. Therefore, that the TA is a positive number means that the start time of the uplink timing is a positive offset relative to the downlink timing. In other words, the uplink timing is before the downlink timing, which is a timing advance generally referred to as.

In this application, a timing value in the satellite communications system may be a positive number or a negative number. That the timing value is a positive number expresses a meaning the same as that expressed by the existing TA, namely, the timing advance. That the timing value is a negative number indicates that the start time of the uplink timing is a negative offset relative to the downlink timing, that is, the uplink timing is after the downlink timing. In this application, a case in which the timing value is a negative number is referred to as a timing lag.

FIG. 5 is a flowchart of a method 200 for uplink timing synchronization applicable to a satellite communications system according to this application. The method 200 may be performed by a satellite base station.

210: Determine, based on beam information of a first beam and ephemeris information of the satellite base station, an uplink timing frame number of a first cell corresponding to the first beam.

In step 210, the satellite base station knows beam information such as a beam direction and a beam width, and ephemeris information. Based on the information, the satellite base station may determine the uplink timing frame number of the first cell. It should be understood that the ephemeris information herein may include information such as an orbit in which the satellite base station is located and an orbit height.

The first beam is any one of beams generated by the satellite base station. Alternatively, the first beam may also be considered as a current beam of the satellite base station.

The satellite base station may determine, based on the beam information of the first beam and the ephemeris information, UE (hereinafter referred to as a second terminal device) that is in the first cell corresponding to the first beam and that is closest to the satellite base station and UE (hereinafter referred to as a third terminal device) that is in the first cell corresponding to the first beam and that is farthest away from the satellite base station. The satellite base station then determines a transmission delay between the second terminal device and the satellite base station and a transmission delay between the third terminal device and the satellite base station, and then determines the uplink timing frame number of the first cell based on the transmission delay between the second terminal device and the satellite base station and the transmission delay between the third terminal device and the satellite base station.

Herein, the satellite base station may determine a near-end UE and a far-end UE, and determine transmission delays of the near-end UE and the far-end UE by using an existing method. Details are not described herein.

The following describes in detail a process in which the satellite base station determines the uplink timing frame number of the first cell based on the transmission delays of the second terminal device and the third terminal device.

Alternatively, the UE closest to the satellite base station (namely, the second terminal device) is also referred to as the near-end UE, and the UE farthest away from the satellite base station (namely, the third terminal device) is also referred to as the far-end UE.

The following uses the UE #1 and the UE #2 shown in FIG. 3 as an example to describe uplink timing of a cell determining process that is applicable to the satellite communications system and that is provided in this application.

It should be noted that, if FIG. 3 is used as an example for description, in this case, the UE #1 and the UE #2 shown in FIG. 3 are not any two UEs in the cell, but are respectively the near-end UE and the far-end UE of the satellite base station.

It is assumed that round-trip delays of the UE #1 and the UE #2 that are determined by the satellite base station are respectively 7.24 ms and 8.8 ms (respectively denoted as an $RTD_1$ and an $RTD_2$ below).

The satellite base station determines a candidate frame number set based on a round-trip delay of the near-end UE (referred to as a first round-trip delay below), a round-trip delay of the far end UE (referred to as a second round-trip delay below), and a plurality of first constraint conditions on an uplink timing frame number. The satellite base station selects, from the candidate frame number set, a first frame number that meets a second constraint condition as an uplink timing frame number of the cell.

It may be understood that, in this application, the uplink timing frame number is cell-level rather than UE-level.

The plurality of first constraint conditions include:

(1) The uplink timing frame number needs to be an integer multiple of a time unit used for communication between the satellite base station and a terminal device.

The time unit herein may be a slot (slot), a subframe, or the like. This is not limited in this application. The following uses the slot as an example for description.

(2) A minimum value of a candidate frame number is an integer that is not greater than and closest to the first round-trip delay and that meets the condition (1).

(3) A maximum value of the candidate frame number is an integer that is not less than and closest to the second round-trip delay and that meets the condition (2).

The candidate frame number set may be determined based on the foregoing first constraint conditions.

For example, in the example shown in FIG. 3, a slot length is 1 ms. Therefore, a minimum value of a candidate frame number that meets the foregoing conditions (1) to (3) should be 7 ms, and a maximum value of the candidate frame number that meets the foregoing conditions (1) to (3) should be 9 ms. After the minimum value and the maximum value of the candidate frame number are determined, the candidate frame number set may be determined. In the example in FIG. 3, the candidate frame number set should be {7, 8, 9}.

Further, a first frame number (denoted as x below) is selected from the candidate frame number set, so that |x−RTD1|+|x−RTD2| is smallest. The x that meets the conditions is the uplink timing frame number of the cell.

It should be understood that the second constraint condition is that x is selected so that |x−RTD1|+|x−RTD2| is smallest.

Optionally, |x−RTD1|+|x−RTD2| may be expressed in another variant, for example, $$\left| x - \frac{RTD1 + RTD2}{2} \right|.$$

This is not limited in this application.

In the example in FIG. 3, x that meets the second constraint condition and that is selected from the candidate frame number set should be 8 ms. 8 ms is an uplink timing frame number of a serving cell of the UE #1 and the UE #2 that is calculated by the satellite base station.

Figure 6:
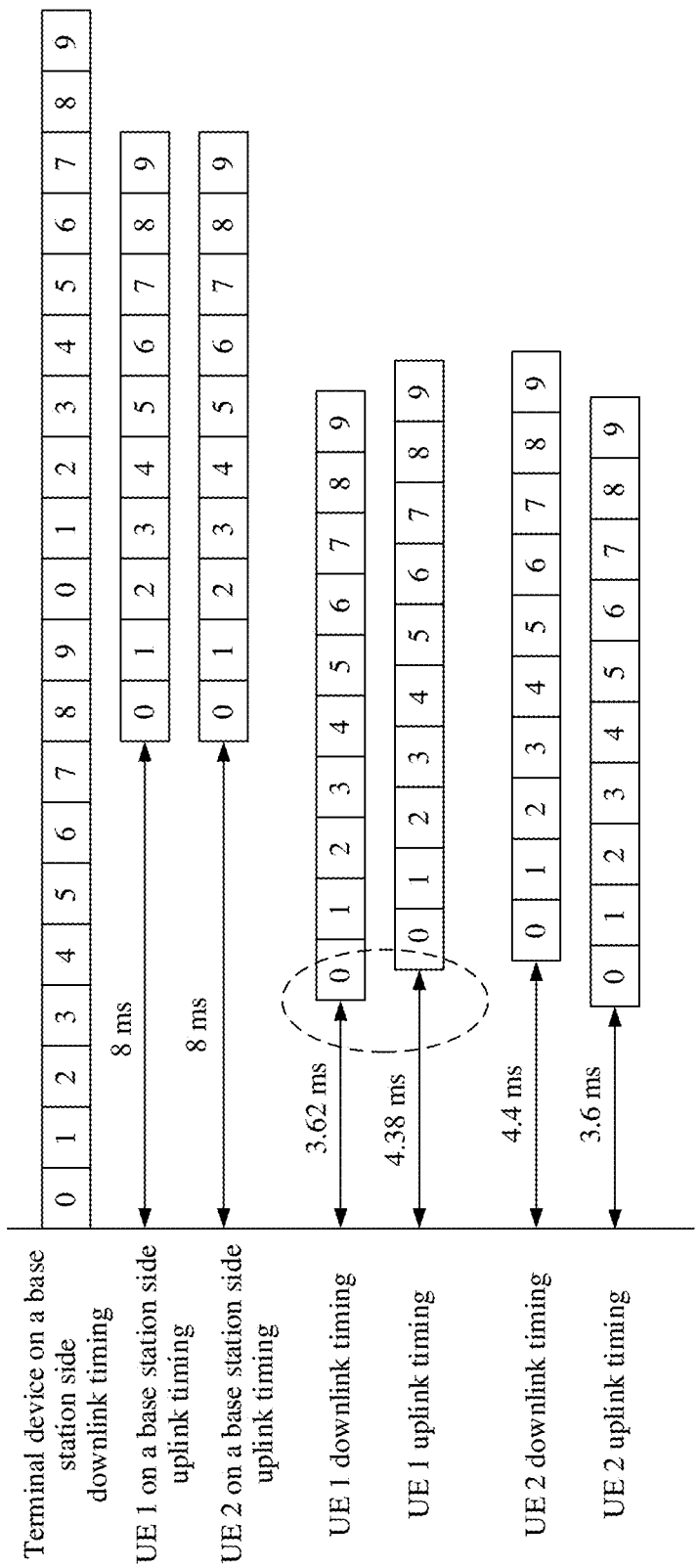
FIG. 6 is an application example of a method for uplink timing synchronization in a satellite communications system according to this application.

FIG. 6 is an application example of a method for uplink timing synchronization in a satellite communications system according to this application.

As shown in FIG. 6, according to the foregoing step 210, uplink timing of the UE #1 and uplink timing of the UE #2 on a base station side are both 8 ms. For the UE #1, a value of timing is negative, that is, UE #1 is a timing lag. The UE #1 performs uplink transmission with a delay of 0.76 ms on the basis of the uplink timing. For the UE #2, a value of timing is positive, that is, UE #2 is a timing advance. The UE #2 performs uplink transmission 0.8 ms in advance on the basis of the uplink timing.

Optionally, in this embodiment of this application, when a value of timing is a positive number, timing information in this case has a same meaning as the existing TA.

Compared the uplink timing of the UE #1 and the uplink timing of the UE #2 shown in FIG. 6 with the uplink timing of the UE #1 and the uplink timing of the UE #2 in FIG. 4, uplink timing frame numbers of the UE #1 and the UE #2 are the same. Therefore, for a cell, the base station side only needs to store an uplink timing frame number configured for the cell, and does not need to store an uplink timing frame number for each UE in the cell, so that storage overheads can be reduced.

220: Determine timing information of a first terminal device in the first cell based on the uplink timing frame number of the first cell.

As described above, the timing information is used to indicate a timing advance or a timing lag.

Herein, the first terminal device refers to any terminal device in the first cell. In other words, the first cell is a serving cell of the first terminal device.

In 220, the satellite base station calculates, based on an RTD of the first terminal device, timing information that enables uplink timing of the first terminal device to be aligned with the uplink timing frame number of the first cell.

FIG. 3 is used as an example. It is assumed that the first terminal device in FIG. 6 is corresponding to the UE #1 shown in FIG. 3. As described above, the RTD of the UE #1=7.24 ms, and to align with the uplink timing frame number (namely, a frame number 8) of the first cell, an uplink signal needs to be sent with a lag. Therefore, that the timing value is negative is first determined. Further, a lag (namely, the timing value) should be (8 ms−7.24 ms)=0.76 ms. Therefore, a TA of the UE #1=−0.76 ms.

For another example, it is assumed that the first terminal device in FIG. 6 is corresponding to the UE #2 shown in FIG. 3. As described above, the RTD of the UE #2=8.8 ms, and to align with the uplink timing frame number of the first cell, the uplink signal needs to be sent in advance. Therefore, that the timing value is positive is first determined. Further, an advance (namely, the timing value) should be (8.8 ms−8 ms)=0.8 ms. Therefore, a TA of the UE #2=0.8 ms.

230: Send the timing information to the first terminal device.

In technical solutions of this application, the satellite base station introduces a positive or negative timing value, so that timing may be a timing advance or may be a timing lag, and uplink timing frame numbers of terminal devices in a same cell can be unified. The satellite base station only needs to store one uplink timing frame number for one cell, and does not need to store one uplink timing frame number for each UE in the cell. Therefore, storage overheads can be reduced.

Figure 7:
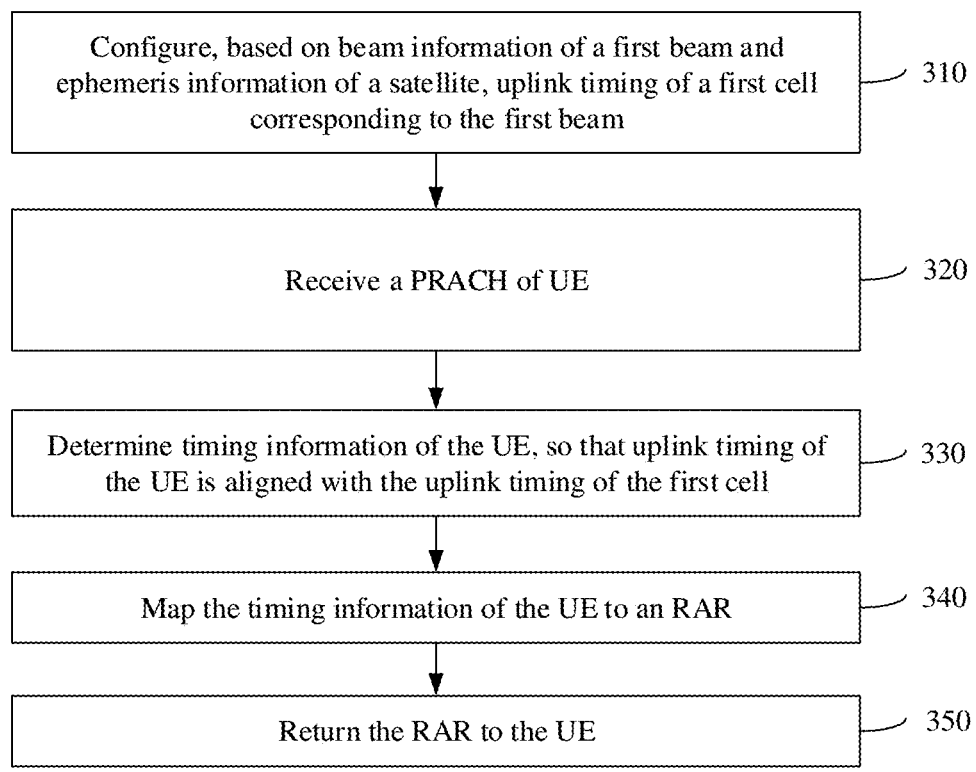
FIG. 7 is an example of a procedure in which a satellite base station configures timing information for UE according to this application.

The following uses a procedure shown in FIG. 7 as an example to describe a process in which the satellite base station configures timing information for UE.

FIG. 7 is an example of a procedure in which a satellite base station configures timing information for UE according to this application.

310: A satellite base station determines, based on beam information of a first beam and orbit information of the satellite base station, an uplink timing frame number of a first cell.

For a specific process, refer to the description of 210. Details are not described herein again.

320: The satellite base station receives a PRACH of UE.

It should be understood that the UE in step 320 is any UE in the first cell.

330: The satellite base station determines timing information of the UE based on the PRACH, so that uplink timing of the UE is aligned with the uplink timing frame number of the first cell.

It should be understood that the satellite base station may determine, based on the PRACH sent by the UE, a transmission delay between the UE and the satellite base station, and further determine the timing information used by the UE to perform uplink timing synchronization.

The timing information is used to indicate a timing advance or a timing lag.

In FIG. 7, that the satellite base station determines the transmission delay of the UE by using the PRACH sent by the UE, to determine the timing information of the UE is merely an example. Alternatively, the satellite base station may determine the transmission delay and further determine the timing information based on another uplink signal sent by the UE. This is not limited in this application.

340: The satellite base station maps the timing information of the UE to an RAR.

After determining the timing information of the UE through calculation, the satellite base station maps the timing information to a response message of the PRACH in step 320, that is, to a random access response (RAR).

Mapping of timing information in an RAR is described below with reference to FIG. 8.

Figure 8:
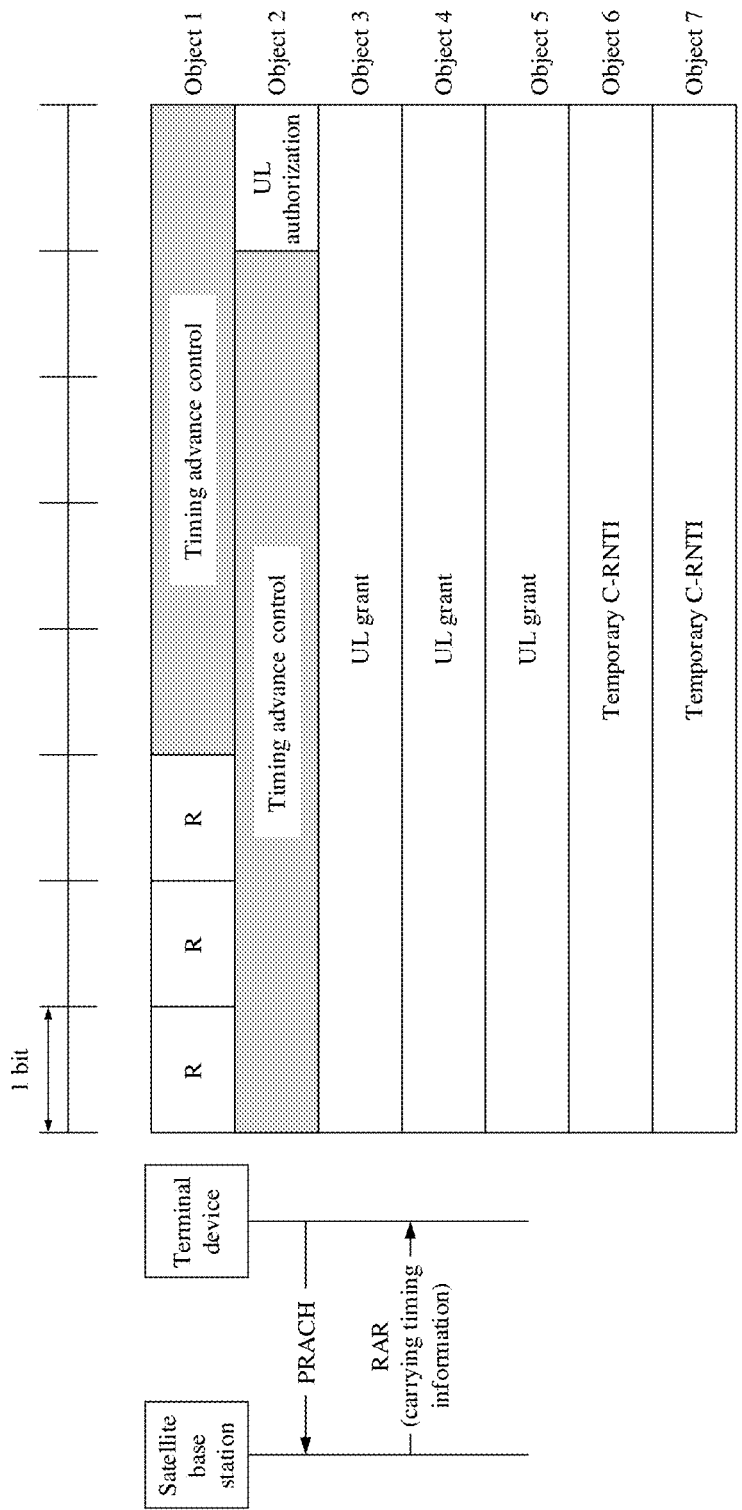
FIG. 8 is a schematic diagram of mapping of timing information in an RAR.

FIG. 8 is a schematic diagram of mapping of timing information in an RAR. As shown in FIG. 8, the RAR includes a plurality of fields. First three bits are reserved bits (R shown in FIG. 8). A timing advance command field includes 12 bits in total.

In addition, "object" shown in FIG. 8 represents an object, "UL grant" represents an uplink grant, and "temporary C-RNTI" represents a cell-temporary radio network temporary identity.

As described above, the timing information includes information used to indicate whether a timing value is positive or negative. Optionally, the information used to indicate whether the timing value is positive or negative is mapped to a first reserved bit, a second reserved bit, or a third reserved bit.

Optionally, the information used to indicate whether the timing value is positive or negative may be further mapped to a first bit or a last bit of a TA field. This is not limited in this application.

In addition, the timing value may be mapped to another bit of the TA field.

350: The satellite base station returns the RAR to the UE.

In step 350, the satellite base station returns the RAR to the UE, so that the UE is notified of the timing information mapped in the RAR.

Figure 9:
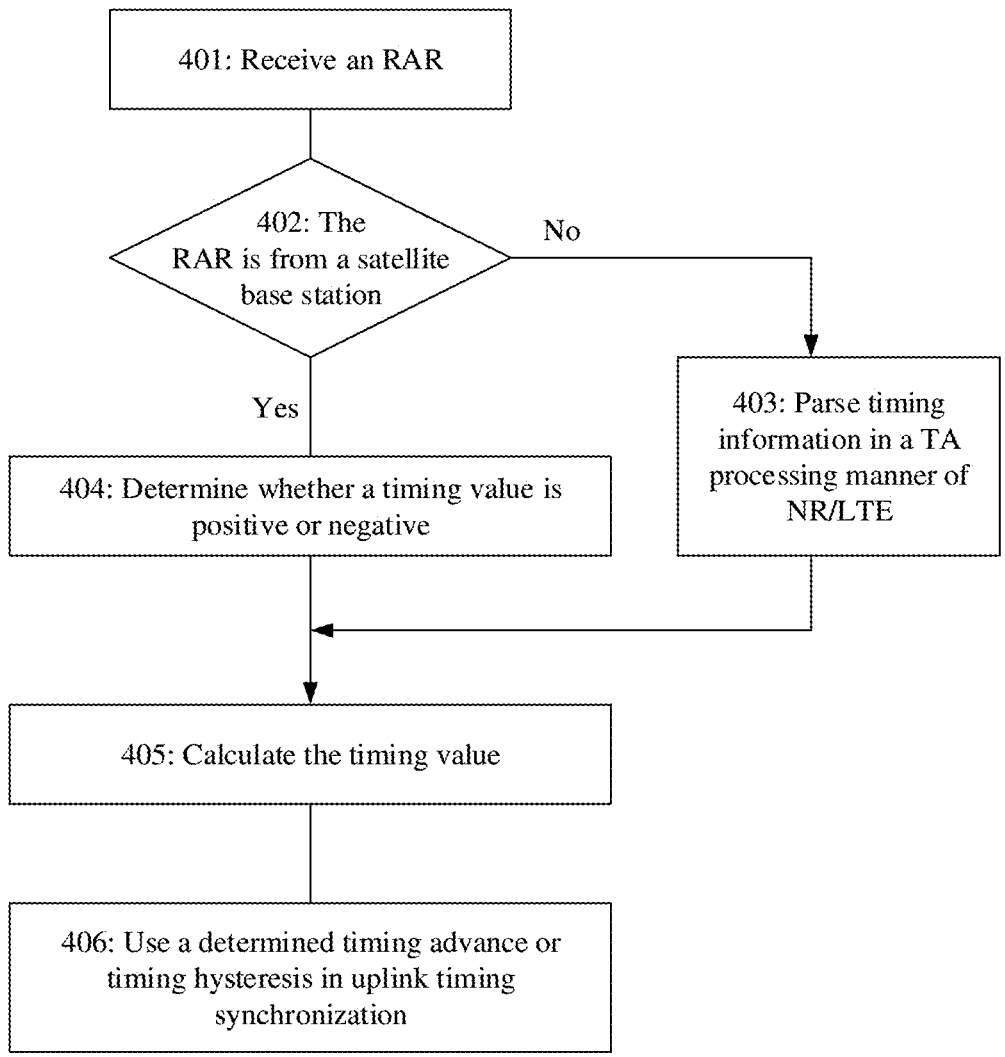
FIG. 9 is a flowchart of processing an RAR on a UE side according to this application.

The following describes processing of an RAR on a UE side with reference to FIG. 9.

FIG. 9 is a flowchart of processing an RAR on a UE side according to this application.

401: UE receives an RAR from a network side.

402: The UE determines whether the RAR is from a satellite base station.

In step 402, the UE determines whether the received RAR is from the satellite base station. Specifically, the UE determines based on an indication of the satellite base station. Actually, before performing random access, the UE may know whether a ground base station or the satellite base station is accessed next.

If the received RAR is from the ground base station, the UE performs step 403. If the received RAR is from the satellite base station, the UE performs step 404.

403: The UE parses timing information in a TA processing manner specified in a standard in LTE or NR, and proceeds to step 405.

404: The UE determines whether a timing value is positive or negative, and proceeds to step 405.

After receiving the RAR from the satellite base station, the UE determines whether the timing value is positive or negative based on timing information carried in the RAR.

For example, in step 340, if the information used to indicate whether the timing value is positive or negative is mapped to the first reserved bit of the RAR, the UE may determine, based on the first reserved bit of the RAR, that the timing value is positive or negative.

405: The UE calculates timing.

In step 405, the UE calculates the timing according to formula (1):

$$\text{Timing} = \pm N_{TA} \times T_C \qquad (1)$$

In formula (1), $T_C$ is a minimum granularity used to adjust a TA in LTE/NR, which is also applicable in this application. A specific value of $T_C$ depends on configuration of a system. For details, refer to a 3GPP TS38.211 reference document. $N_{TA}$ refers to the timing value of the timing information carried in the RAR.

It should be understood that a positive or negative sign in formula (1) is determined by whether the timing value determined in step 404 is positive or negative.

It should be understood that whether the timing value is positive or negative in this embodiment of this application may alternatively be expressed as that the timing value is positive or negative.

406: The UE uses the calculated timing for uplink timing synchronization.

It can be learned from the flowchart shown in FIG. 9 that, once receiving the RAR, the UE first determines whether a base station that sends the RAR is the satellite base station. If the base station is not the satellite base station, the timing information in the RAR is processed in the TA processing manner specified in the standard in the LTE or the NR. In other words, it is not required to determine whether the timing value is positive or negative (because TAs are positive), and the timing value may be directly calculated. If the base station that sends the RAR is the satellite base station, the UE needs to parse the timing information to determine whether the timing value is positive or negative, and calculate the timing value.

Subsequently, the UE uses the calculated timing for uplink transmission.

It should be understood that, in FIG. 7 to FIG. 9, the satellite base station determines a transmission delay of the UE by using a PRACH, and notifies the UE of the timing information by using the RAR are merely an example. Actually, the satellite base station may determine the transmission delay of the UE by using any uplink signal of the UE, and determine timing information of the UE. In these cases, a process of processing a downlink signal that is received from a satellite base station side and that carries timing information by the UE is similar to the process of processing the RAR shown in FIG. 9. Details are not described herein again.

It is considered that the satellite base station continuously runs along an orbit, in a running process, a serving beam for one UE may change accordingly.

Figure 10:
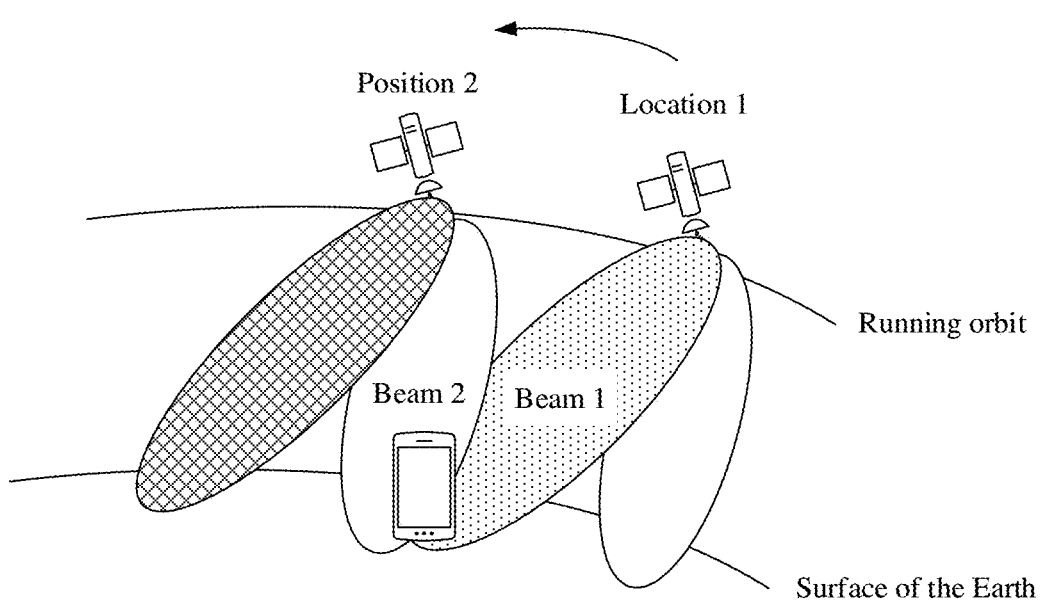
FIG. 10 is a schematic diagram of a change of a serving beam of UE in a satellite running process.

FIG. 10 is a schematic diagram of a change of a serving beam of UE in a satellite running process. For example, in a process of running along an orbit by the satellite, for example, in a process of running from a position 1 to a position 2, the serving beam of the UE is switched from a beam 1 to a beam 2. It should be understood that when the satellite is at the position 1, the serving beam of the UE is the beam 1, and when the satellite runs from the position 1 to the position 2, the serving beam of the UE is switched to the beam 2.

In a terrestrial communications system, the UE needs to initiate a random access procedure again for cell handover. However, because a delay of signal transmission between the satellite and the ground is relatively large, beam handover (namely, cell handover) caused by satellite running is more frequent. If random access is re-initiated in each cell handover, a service of the UE needs to be interrupted, resulting in low handover efficiency.

In consideration of the foregoing cases, this application further proposes a cell handover method applied to a satellite communications system. The following describes the method with reference to FIG. 11.

Figure 11:
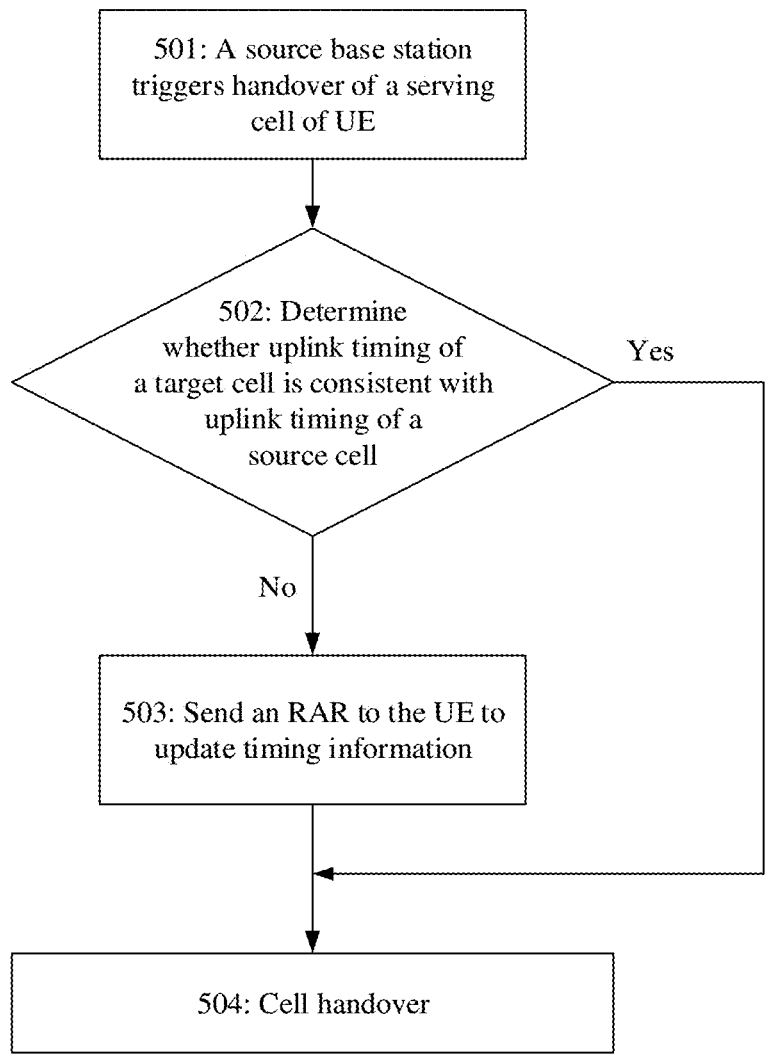
FIG. 11 is a flowchart of cell handover in a satellite communications system according to this application.

FIG. 11 is a flowchart of cell handover in a satellite communications system according to this application.

501: A source base station determines that UE triggers cell handover.

Herein, a factor for triggering handover of a serving cell by the UE is not limited. For example, in FIG. 10 above, that a satellite moves along an orbit may trigger handover of the serving cell (namely, a serving beam) of the UE.

502: The source base station determines whether uplink timing of a target cell is consistent with uplink timing of a source cell.

It should be understood that the uplink timing of the target cell and the uplink timing of the source cell herein refer to cell-level uplink timing proposed in this application.

If the uplink timing of the target cell is consistent with the uplink timing of the source cell, the source base station performs step 504, that is, the source base station directly triggers cell handover.

If the uplink timing of the target cell is inconsistent with the uplink timing of the source cell, the source base station performs step 503.

503: The source base station sends an RAR to the UE, where the RAR carries timing information of the UE determined based on an uplink timing frame number of the target cell.

It should be understood that the RAR carries timing information corresponding to the target cell, which is used by the UE to update timing information of the source cell to timing information of the target cell. In other words, when the uplink timing of the source cell is inconsistent with the uplink timing of the target cell, the source base station notifies the UE of the timing information of the target cell by using the RAR.

After step 503, the source base station performs step 504.

After receiving the RAR, the UE updates stored timing information of the source cell to the timing information of the target cell, and sends an uplink signal to the target cell based on the timing information of the target cell.

It may be understood that the method for uplink timing synchronization and the cell handover method provided in this application may be used together, or may be used separately. This is not limited in this application.

When the two methods are used together, it may be considered that a first terminal device performs uplink timing synchronization with the first cell according to the method for uplink timing synchronization provided in this application. After accessing the first cell, if the first terminal device triggers cell handover, a satellite base station performs cell handover according to the cell handover procedure provided in this application.

The method embodiments of this application are described in detail above. The following describes a communications apparatus provided in this application.

Figure 12:
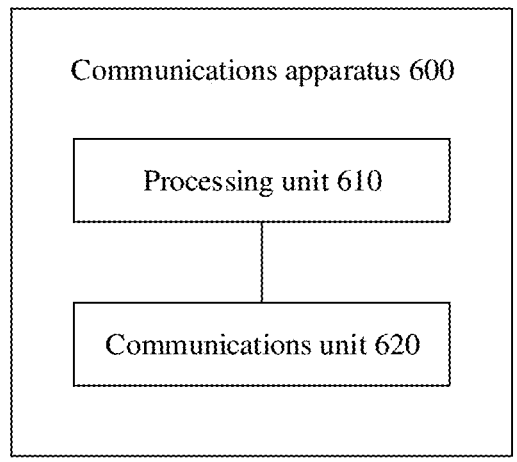
FIG. 12 is a schematic block diagram of a communications apparatus 600 according to this application.

FIG. 12 is a schematic block diagram of a communications apparatus 600 according to this application. The communications apparatus 600 includes: a processing unit 610 and a communications unit 620.

In an embodiment, the communications apparatus 600 has a function of a satellite base station in a method embodiment for uplink timing synchronization. For example, the communications apparatus 600 may be a chip or an integrated circuit. In this case, units of the communications apparatus 600 are separately configured to perform the following operations and/or processing.

The processing unit 610 is configured to determine, based on beam information of a first beam and ephemeris information of the satellite base station, an uplink timing frame number of a first cell corresponding to the first beam, and determine timing information of a first terminal device in the first cell based on the uplink timing frame number of the first cell, where the timing information is used to indicate a timing advance or a timing lag.

The communications unit 620 is configured to output the timing information.

In this case, the processing unit 610 may be a processor. The communications unit 620 may be a communications interface, for example, an input/output interface or a transceiver circuit.

Optionally, the processing unit 610 is further configured to determine, based on the beam information of the first beam and the ephemeris information of the satellite base station, a second terminal device and a third terminal device in the first cell, determine a candidate frame number set of the first cell based on a first round-trip delay of signal transmission between the second terminal device and the satellite base station and a second round-trip delay of signal transmission between the third terminal device and the satellite base station, and select a first frame number from the candidate frame number set as the uplink timing frame number of the first cell. The second terminal device is a terminal device that is in the first cell and that is closest to the satellite base station, and the third terminal device is a terminal device that is in the first cell and that is farthest away from the satellite base station.

Optionally, the processing unit 610 is further configured to determine the candidate frame number set based on the first round-trip delay, the second round-trip delay, and a plurality of first constraint conditions. For the plurality of first constraint conditions, refer to the description of the method embodiments.

Optionally, the processing unit 610 is specifically configured to select, from the candidate frame number set, x with smallest $|x-RTD_1|+|x-RTD_2|$ or $$\left|x - \frac{RTD_1 + RTD_2}{2}\right|$$

as the uplink timing frame number of the first cell, where x is the first frame number, $RTD_1$ is the first round-trip delay, and $RTD_2$ is the second round-trip delay.

In another embodiment, the communications apparatus 600 has a function of a satellite base station in a method embodiment for cell handover. In this case, units of the communications apparatus 600 are separately configured to perform the following operations and/or processing.

The processing unit 610 is configured to: when determining that a first terminal device triggers cell handover, determine whether an uplink timing frame number of a target cell is consistent with an uplink timing frame number of a source cell.

The communications unit 620 is configured to: when the processing unit 610 determines that the uplink timing frame number of the target cell is inconsistent with the uplink timing frame number of the source cell, output timing information of the target cell, where the timing information is used to indicate a timing advance or a timing lag for performing uplink timing synchronization between the first terminal device and the target cell.

In this case, the processing unit 610 may be a processor. The communications unit 620 may be a communications interface, for example, an input/output interface or a transceiver circuit.

Optionally, the processing unit 610 is further configured to: when determining that the uplink timing frame number of the target cell is consistent with the uplink timing frame number of the first cell, hand over the first terminal device from the first cell to the target cell with the communications unit 620.

Optionally, the communications apparatus 600 may also have a function of configuring an uplink timing frame number of a cell by a satellite base station and a function of performing cell handover in method embodiments. For similar description, refer to description in the foregoing method embodiments. To avoid repetition, details are not described herein again.

Alternatively, the processing unit 610 may be a processing apparatus, and some or all functions of the processing apparatus may be implemented by using software.

In an implementation, some or all functions of the processing apparatus may be implemented by using software. In this case, the processing apparatus may include a memory and a processor. The memory is configured to store a computer program, and the processor reads and executes the computer program stored in the memory, to perform steps implemented internally by the satellite base station in the method embodiments.

Optionally, in another implementation, the processing apparatus includes a processor. A memory configured to store a computer program is located outside the processing apparatus. The processor is connected to the memory by using a circuit/wire, and is configured to read and execute the computer program stored in the memory.

In another implementation, all functions of the processing apparatus may be implemented by using hardware. In this case, the processing apparatus may include an input interface circuit, a logic circuit, and an output interface circuit. The input interface circuit is configured to obtain the beam information of the first beam and the ephemeris information of the satellite base station. The logic circuit is configured to determine, based on the beam information of the first beam and the ephemeris information of the satellite base station that are obtained by the input interface circuit, the uplink timing frame number of the first cell corresponding to the first beam. The output interface circuit is configured to output the uplink timing frame number of the first cell.

Optionally, the output interface circuit outputs the uplink timing frame number of the first cell to the memory, and the memory stores the uplink timing frame number of the first cell.

Optionally, the processing unit 610 may be a baseband apparatus.

In another embodiment, the communications apparatus 600 may be corresponding to the satellite base station in the embodiments of FIG. 5 to FIG. 8. In this case, the processing unit 610 included in the communications apparatus 600 may be a processor, and the communications unit 620 included in the communications apparatus 600 may be a transceiver. The transceiver includes a transmitter and a receiver.

The processor determines, based on the beam information of the first beam and the ephemeris information of the satellite base station, the uplink timing frame number of the first cell corresponding to the first beam, and determines timing information of the first terminal device in the first cell based on the uplink timing frame number of the first cell. The transceiver is configured to send the timing information to the first terminal device, so that the terminal device performs uplink timing synchronization with the first cell.

Alternatively, when determining that the first terminal device triggers cell handover, the processor determines whether the uplink timing frame number of the target cell is consistent with the uplink timing frame number of the source cell. When the uplink timing frame number of the target cell is inconsistent with the uplink timing frame number of the source cell, the processor determines timing information of the first terminal device in the target cell, where the timing information is used to indicate a timing advance or a timing lag for performing uplink timing synchronization between the first terminal device and the target cell, and the transceiver sends the timing information of the target cell to the terminal device, so that the terminal device performs uplink timing synchronization with the target cell. When the uplink timing frame number of the target cell is consistent with the uplink timing frame number of the source cell, the processor and the transceiver directly hand over the first terminal device from the source cell to the target cell.

In this case, units included in the communications apparatus 600 are separately configured to perform corresponding operations and/or processing performed by the satellite base station in the method embodiments. For similar description, refer to description in the foregoing method embodiments. To avoid repetition, details are not described herein again.

Figure 13:
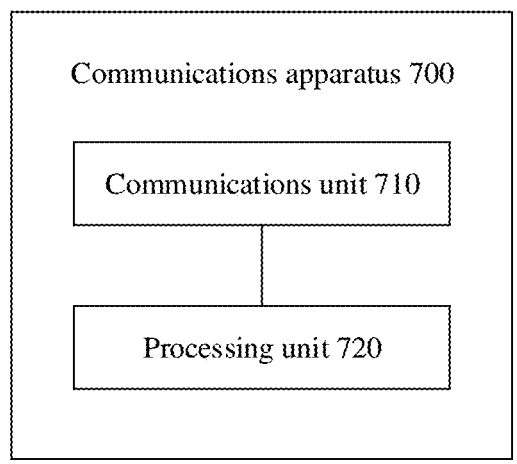
FIG. 13 is a schematic block diagram of a communications apparatus 700 according to this application.

FIG. 13 is a schematic block diagram of a communications apparatus 700 according to this application. The communications apparatus 700 includes a communications unit 710 and a processing unit 720.

In an embodiment, units of the communications apparatus 700 are separately configured to perform the following operations and/or processing.

The communications unit 710 is configured to obtain timing information used for uplink timing synchronization.

The processing unit 720 is configured to determine a timing advance or a timing lag based on the timing information obtained by a communications interface.

The communications unit 710 is further configured to output the timing advance or the timing lag determined by the processing unit 720.

In this case, the communications unit 710 may be a communications interface, for example, an input/output interface or a transceiver circuit. The processing unit 720 may be a processor.

In an embodiment, units of the communications apparatus 700 are separately configured to perform the following operations and/or processing.

The communications unit 710 is configured to receive timing information of a target cell, where the timing information is used to indicate a timing advance or a timing lag.

The processing unit 720 is configured to determine the timing advance or the timing lag based on the timing information.

In this case, the communications unit 710 may be a communications interface, for example, an input/output interface or a transceiver circuit. The processing unit 720 may be a processor.

Optionally, the processing unit 720 is further configured to determine that the timing information is from a satellite base station.

Optionally, the processing unit 720 is further configured to determine the timing advance or the timing lag based on the timing information.

Optionally, the communications unit 710 is further configured to receive the timing information of the target cell from the satellite base station, and the processing unit 720 is further configured to update timing information of a first cell to the timing information of the target cell.

Alternatively, the processing unit 720 may be a processing apparatus, and some or all functions of the processing apparatus may be implemented by using software.

In an implementation, some or all functions of the processing apparatus may be implemented by using software. In this case, the processing apparatus may include a memory and a processor. The memory is configured to store a computer program, and the processor reads and executes the computer program stored in the memory, to perform steps implemented internally by a terminal device in the method embodiments.

Optionally, in another implementation, the processing apparatus includes a processor. A memory configured to store a computer program is located outside the processing apparatus. The processor is connected to the memory by using a circuit/wire, and is configured to read and execute the computer program stored in the memory.

In another implementation, all functions of the processing apparatus may be implemented by using hardware. In this case, the processing apparatus may include an input interface circuit, a logic circuit, and an output interface circuit. The input interface circuit is configured to obtain timing information. The logic circuit is configured to parse the timing information to determine a timing advance or a timing lag. The output interface circuit is configured to output the timing advance or the timing lag.

Optionally, in some embodiments, the logic circuit is further configured to: determine whether the timing information comes from the satellite base station, and parse the timing information when determining that the timing information comes from the satellite base station. If the logic circuit determines that the timing information is from a ground station, the logic circuit parses the time information in a TA processing manner specified in a standard in LTE or NR (that is, it is not necessary to determine whether a timing value is positive or negative) and directly determine the timing value. If the logic circuit determines that the timing information is from the satellite base station, whether the timing value is positive or negative needs to be determined based on the timing information, and the timing value needs to be calculated.

Optionally, the output interface circuit outputs a parsing result of the timing information to the memory for storage.

In another embodiment, the communications apparatus 700 may completely correspond to the terminal device (for example, a first terminal device of the first cell) in the method embodiments. Corresponding units of the communications apparatus 700 is separately configured to perform a corresponding operation and/or processing performed by the terminal device in the method embodiments.

The communications unit 710 included in the communications apparatus 700 may be a transceiver. The transceiver includes a transmitter and a receiver. The processing unit 720 may be a processor.

The transceiver is configured to receive timing information used to perform uplink timing synchronization with the first cell. The processor determines a timing advance or a timing lag based on the timing information received by the transceiver. The processor and the transceiver are further configured to perform uplink timing synchronization between the terminal device and the first cell based on the timing advance or the timing lag.

Alternatively, after the terminal device triggers cell handover, the transceiver receives the timing information of the target cell. The processor determines, based on the timing information of the target cell received by the transceiver, a timing advance or a timing lag for performing uplink timing synchronization with the target cell. After determining the timing advance or the timing lag, the transceiver and the processor hand over the terminal device from a source cell to the target cell.

In this case, units included in the communications apparatus 700 are separately configured to perform corresponding operations and/or processing performed by the terminal device in the method embodiments. For similar description, refer to description in the foregoing method embodiments. To avoid repetition, details are not described herein again.

Figure 14:
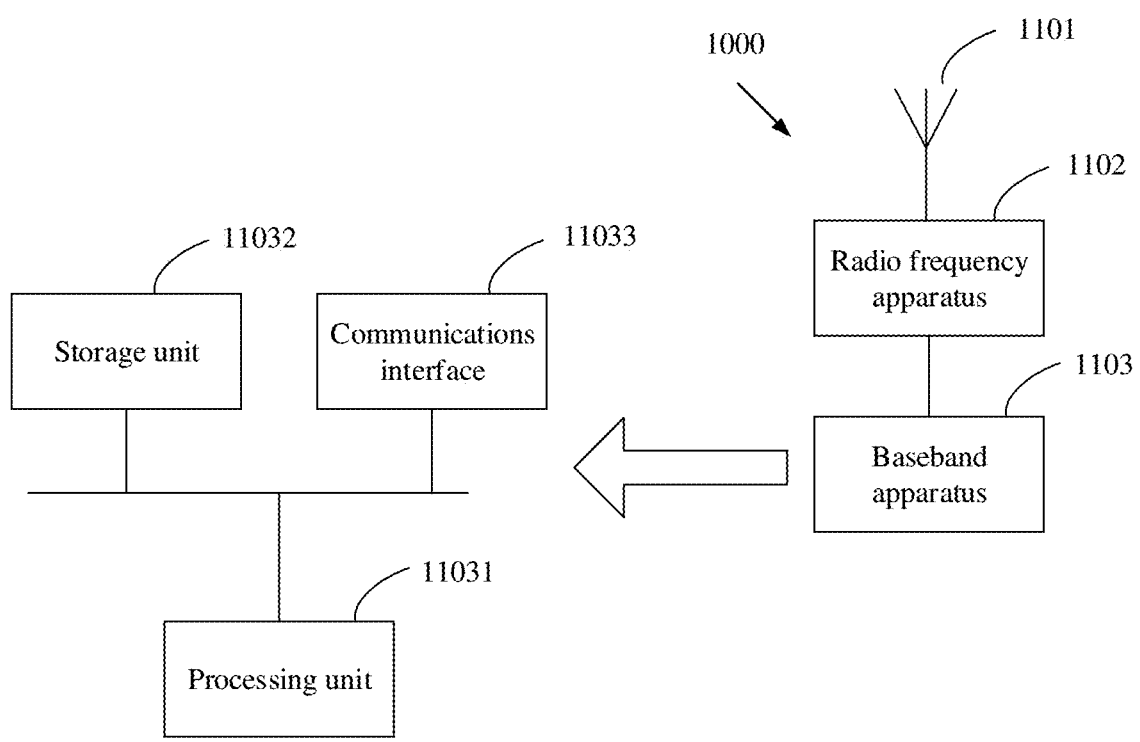
FIG. 14 is a schematic structural diagram of a network device according to this application.

FIG. 14 is a schematic structural diagram of a network device according to this application. A network device 1000 may correspond to the satellite base station in method embodiments. As shown in FIG. 14, the network device 1000 includes an antenna 1101, a radio frequency apparatus 1102, and a baseband apparatus 1103. The antenna 1101 is connected to the radio frequency apparatus 1102. In an uplink direction, the radio frequency apparatus 1102 receives a signal from a terminal device by using the antenna 1101, and sends the received signal to the baseband apparatus 1103 for processing. In a downlink direction, the baseband apparatus 1103 generates a signal that needs to be sent to the terminal device, and sends the generated signal to the radio frequency apparatus 1102. The radio frequency apparatus 1102 transmits the signal by using the antenna 1101.

The baseband apparatus 1103 may include one or more processing units 11031. The processing unit 11031 may be specifically a processor.

In addition, the baseband apparatus 1103 may further include one or more storage units 11032 and one or more communications interfaces 11033. The storage unit 11032 is configured to store a computer program and/or data. The communications interface 11033 is configured to exchange information with the radio frequency apparatus 1102. The storage unit 11032 may be specifically a memory, and the communications interface 11033 may be an input/output interface or a transceiver circuit.

Optionally, the storage unit 11032 may be a storage unit located on a same chip as the processing unit 11031, namely, an on-chip storage unit, or may be a storage unit located on a different chip from the processing unit, namely, an off-chip storage unit. This is not limited in this application.

Optionally, when the communications apparatus 600 is a satellite base station, the processing unit 610 shown in FIG. 12 may be the baseband apparatus 1103 shown in FIG. 14. The communications unit 62o may be a radio frequency apparatus 1102.

Optionally, when the communications apparatus 600 is a chip or an integrated circuit, the processing unit 610 shown in FIG. 12 may be the processing unit 11031 shown in FIG. 14, and the communications unit 620 may be the communications interface 11033 shown in FIG. 14.

Figure 15:
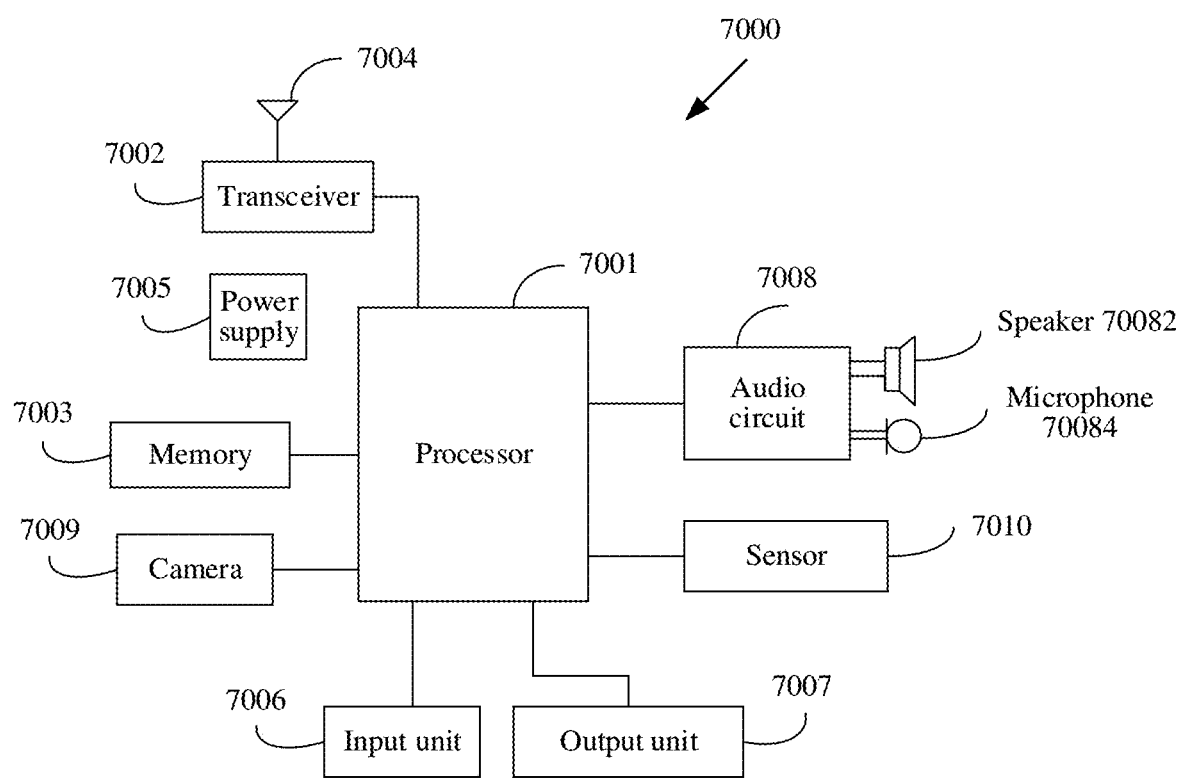
FIG. 15 is a schematic structural diagram of a terminal device according to this application.

FIG. 15 is a schematic structural diagram of a terminal device according to this application. As shown in FIG. 15, a terminal device 7000 includes a processor 7001 and a transceiver 7002.

Optionally, the terminal device 7000 further includes a memory 7003. The processor 7001, the transceiver 7002, and the memory 7003 may communicate with each other through an internal connection path, to transfer a control signal and/or a data signal.

The memory 7003 is configured to store a computer program. The processor 7001 is configured to execute the computer program stored in the memory 7003, to implement the functions of a communications apparatus 700 in the foregoing apparatus embodiments.

Specifically, the processor 7001 may be configured to perform the operation and/or processing performed by the processing unit 720 described in the apparatus embodiments (for example, FIG. 13), and the transceiver 7002 is configured to perform the operation and/or processing performed by the transceiver unit 710.

For example, the transceiver 7002 receives TA information from a network side. For another example, the processor 7001 determines whether a TA is positive or negative and a value of the TA based on the TA information received by the transceiver 7002.

Optionally, the memory 7003 may be integrated into the processor 7001, or may be independent of the processor 7001.

Optionally, the terminal device 7000 may further include an antenna 7004, configured to transmit a signal output by the transceiver 7002. Alternatively, the transceiver 7002 receives a signal through the antenna.

Optionally, the terminal device 7000 may further include a power supply 7005, configured to supply power to various devices or circuits in the terminal device.

In addition, to improve functions of the terminal device, the terminal device 7000 may further include one or more of an input unit 7006, an output unit 7007, an audio circuit 7008, a camera lens 7009, a sensor 610, and the like. The audio circuit may further include a speaker 70082, a microphone 70084, and the like. Details are not described herein.

Optionally, when the communications apparatus 700 is a terminal device, the communications unit 710 shown in FIG. 13 may be the transceiver 7002 shown in FIG. 15, and the processing unit 720 may be the processor 7001.

Optionally, when the communications apparatus 700 is a chip or an integrated circuit, the communications unit 710 shown in FIG. 13 may be the input unit 7006 or the output unit 7007 shown in FIG. 15, and the processing unit 720 may be the processor 7001.

In addition, this application further provides a communications system, including the satellite base station and the terminal device described in the method embodiments.

This application further provides a computer-readable storage medium. The computer-readable storage medium stores a computer program. When the computer program is executed by a computer, the computer is enabled to perform the steps and/or the processing in any foregoing method embodiment performed by the satellite base station.

This application further provides a computer program product. The computer program product includes computer program code. When the computer program code is run on a computer, the computer is enabled to perform the steps and/or the processing in any foregoing method embodiment performed by the satellite base station.

This application further provides a chip, and the chip includes a processor. A memory configured to store a computer program is disposed independent of the chip. The processor is configured to execute the computer program stored in the memory, to perform the steps and/or the processing in any method embodiment performed by the satellite base station.

Further, the chip may include the memory and a communications interface. The communications interface may be an input/output interface, a pin, an input/output circuit, or the like.

This application further provides a computer-readable storage medium. The computer-readable storage medium stores a computer program. When the computer program is executed by a computer, the computer is enabled to perform the operations and/or the processing in any foregoing method embodiment performed by the terminal device.

This application further provides a computer program product. The computer program product includes computer program code. When the computer program code is run on a computer, the computer is enabled to perform the operations and/or the processing in any foregoing method embodiment performed by the terminal device.

This application further provides a chip, and the chip includes a processor. A memory configured to store a computer program is disposed independent of the chip. The processor is configured to execute the computer program stored in the memory, to perform the operations and/or the processing in any method embodiment performed by the terminal device.

Further, the chip may include the memory and a communications interface. The communications interface may be an input/output interface, a pin, an input/output circuit, or the like.

The processor mentioned in the foregoing embodiments may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The general purpose processor may be a microprocessor, or the processor may be any conventional processor or the like. Steps in the methods disclosed with reference to the embodiments of this application may be directly performed by using a hardware encoding processor, or may be performed by using a combination of hardware and software modules in the encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the foregoing embodiments may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in the form of a software product. The computer software product is stored in a storage medium and includes several instructions for instructing a computer device (which is a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a satellite base station based on beam information of a first beam and ephemeris information of the satellite base station, an uplink timing frame number of a first cell corresponding to the first beam;
   determining, by the satellite base station based on the uplink timing frame number of the first cell, timing information of a first terminal device in the first cell, wherein the timing information indicates a timing advance or a timing lag; and
   outputting, by the satellite base station, the timing information of the first terminal device.

2. The method according to claim 1, wherein determining the uplink timing frame number of the first cell corresponding to the first beam comprises:
   determining, based on the beam information of the first beam and the ephemeris information of the satellite base station, a second terminal device and a third terminal device in the first cell, wherein the second terminal device is a terminal device that is closest to the satellite base station in the first cell, and the third terminal device is a terminal device that is farthest away from the satellite base station in the first cell;
   determining a candidate frame number set of the first cell based on a first round-trip delay for signal transmission between the second terminal device and the satellite base station and a second round-trip delay for signal transmission between the third terminal device and the satellite base station; and
   selecting a first frame number from the candidate frame number set as the uplink timing frame number of the first cell.

3. The method according to claim 2, wherein determining the candidate frame number set based on the first round-trip delay and the second round-trip delay comprises:
   determining the candidate frame number set based on the first round-trip delay, the second round-trip delay, and a plurality of first constraint conditions, wherein the plurality of first constraint conditions comprises:
      candidate frame numbers are integer multiples of a time unit for communication between the satellite base station and terminal devices;
      a minimum value of the candidate frame numbers is an integer that is not greater than and is closest to the first round-trip delay; and
      a maximum value of the candidate frame numbers is an integer that is not less than and is closest to the second round-trip delay.

4. The method according to claim 2, wherein selecting the first frame number from the candidate frame number set as the uplink timing frame number of the first cell comprises:
   selecting, from the candidate frame number set, x a candidate frame having a smallest value of $|x-RTD_1|+|x-RTD_2|$ or $$\left| x - \frac{RTD_1 + RTD_2}{2} \right|$$

as the uplink timing frame number of the first cell, wherein x is the respective candidate frame number, $RTD_1$ is the first round-trip delay, and $RTD_2$ is the second round-trip delay.

5. The method according to claim 1, further comprising:
   after the first terminal device accesses the first cell, determining that the first terminal device triggers cell handover;
   determining whether an uplink timing frame number of a target cell is consistent with the uplink timing frame number of the first cell; and
   in response to determining that the uplink timing frame number of the target cell is inconsistent with the uplink timing frame number of the first cell, sending timing information of the target cell to the first terminal device.

6. The method according to claim 1, further comprising:
   after the first terminal device accesses the first cell, determining that the first terminal device triggers cell handover;
   determining whether an uplink timing frame number of a target cell is consistent with the uplink timing frame number of the first cell; and
   in response to determining that the uplink timing frame number of the target cell is consistent with the uplink timing frame number of the first cell, handing over the first terminal device from the first cell to the target cell.

7. The method according to claim 1, wherein the timing information comprises a timing value and an indication of whether the timing value is positive or negative, and wherein when the timing value is positive, the timing information indicates the timing advance, or when the timing value is negative, the timing information indicates the timing lag.

8. A method, comprising:
   receiving, by a terminal device, timing information usable to perform uplink timing synchronization with a first cell, wherein the timing information is determined based on an uplink timing frame number of the first cell, and the uplink timing frame number is determined based on beam information of a first beam and ephemeris information of a satellite base station;
   determining, by the terminal device, a timing advance or a timing lag based on the timing information; and
   performing, by the terminal device, uplink timing synchronization with the first cell based on the timing advance or the timing lag.

9. The method according to claim 8, further comprising:
   before determining the timing advance or the timing lag based on the timing information, determining that the timing information is sent from the satellite base station.

10. The method according to claim 8, wherein the timing information comprises a timing value and an indication of whether the timing value is positive or negative, and determining the timing advance or the timing lag based on the timing information comprises:
   in response to determining that the timing value is positive, determining the timing advance based on the timing value; or
   in response to determining that the timing value is negative, determining the timing lag based on the timing value.

11. The method according to claim 8, further comprising:
after accessing the first cell, triggering cell handover;
receiving timing information of a target cell from the satellite base station; and
updating the timing information of the first cell to the timing information of the target cell.

12. The method according to claim 11, further comprising:
performing uplink timing synchronization with the target cell based on the timing information of the target cell.

13. An apparatus, comprising:
a processor; and
a non-transitory memory, wherein the non-transitory memory is configured to store a computer program, and the processor is configured to invoke and execute the computer program, and the computer program includes instructions to:
determine, based on beam information of a first beam and ephemeris information of a satellite base station, an uplink timing frame number of a first cell corresponding to the first beam;
determine, based on the uplink timing frame number of the first cell, timing information of a first terminal device in the first cell, wherein the timing information indicates a timing advance or a timing lag; and
output the timing information of the first terminal device.

14. The apparatus according to claim 13, wherein the computer program includes instructions to:
determine, based on the beam information of the first beam and the ephemeris information of the satellite base station, a second terminal device and a third terminal device in the first cell, wherein the second terminal device is a terminal device that is closest to the satellite base station in the first cell, and the third terminal device is a terminal device that is farthest away from the satellite base station in the first cell;
determine a candidate frame number set of the first cell based on a first round-trip delay for signal transmission between the second terminal device and the satellite base station and a second round-trip delay for signal transmission between the third terminal device and the satellite base station; and
select a first frame number from the candidate frame number set as the uplink timing frame number of the first cell.

15. The apparatus according to claim 14, wherein the computer program includes instructions to:
determine the candidate frame number set based on the first round-trip delay, the second round-trip delay, and a plurality of first constraint conditions, wherein the plurality of first constraint conditions comprises:
candidate frame numbers are integer multiples of a time unit for communication between the satellite base station and terminal devices;
a minimum value of the candidate frame numbers is an integer that is not greater than and is closest to the first round-trip delay; and
a maximum value of the candidate frame numbers is an integer that is not less than and is closest to the second round-trip delay.

16. The apparatus according to claim 14, wherein the computer program includes instructions to:
select, from the candidate frame number set, a candidate frame number having a smallest value of $|x-RTD_1|+|x-RTD_2|$ or $$\left| x - \frac{RTD_1 + RTD_2}{2} \right|$$

as the uplink timing frame number of the first cell, wherein x is the respective candidate frame number, $RTD_1$ is the first round-trip delay, and $RTD_2$ is the second round-trip delay.

17. The apparatus according to claim 13, wherein the computer program includes instructions to:
determine that the first terminal device triggers cell handover;
determine whether an uplink timing frame number of a target cell is consistent with the uplink timing frame number of the first cell; and
in response to determining that the uplink timing frame number of the target cell is inconsistent with the uplink timing frame number of the first cell, send timing information of the target cell to the first terminal device.

18. The apparatus according to claim 13, wherein the computer program includes instructions to:
determine that the first terminal device triggers cell handover;
determine whether an uplink timing frame number of a target cell is consistent with the uplink timing frame number of the first cell; and
in response to determining that the uplink timing frame number of the target cell is consistent with the uplink timing frame number of the first cell, hand over the first terminal device from the first cell to the target cell.

19. The apparatus according to claim 13, wherein the timing information comprises a timing value and an indication of whether the timing value is positive or negative, and wherein:
when the timing value is positive, the timing information indicates the timing advance, or
when the timing value is negative, the timing information indicates the timing lag.

* * * * *